(12) United States Patent
Gregg et al.

(10) Patent No.: US 8,600,311 B2
(45) Date of Patent: *Dec. 3, 2013

(54) SIMULTANEOUS SENSITIVITY TESTING FOR MULTIPLE DEVICES IN RADIO-FREQUENCY TEST SYSTEMS

(75) Inventors: Justin Gregg, San Francisco, CA (US);
Adil Syed, Santa Clara, CA (US);
Vishwanath Venkataraman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 237 days.

This patent is subject to a terminal disclaimer.

(21) Appl. No.: 13/044,857

(22) Filed: Mar. 10, 2011

(65) Prior Publication Data

US 2012/0231745 A1 Sep. 13, 2012

(51) Int. Cl.
*H04B 17/00* (2006.01)

(52) U.S. Cl.
USPC ................................. 455/67.12; 455/67.11

(58) Field of Classification Search
USPC ............................................ 455/67.11, 67.12
See application file for complete search history.

(56) References Cited

U.S. PATENT DOCUMENTS 6,144,692 A * 11/2000 Beck .............................. 375/130
7,206,549 B2 4/2007 Lin et al.
2005/0176376 A1 8/2005 Liu
2007/0275667 A1 11/2007 Leung et al.
2010/0077270 A1 3/2010 Rupp et al.
2011/0237199 A1* 9/2011 Venkataraman et al. .. 455/67.11
2012/0100813 A1* 4/2012 Mow et al. ................. 455/67.12
2012/0207030 A1* 8/2012 Luong ........................... 370/245

OTHER PUBLICATIONS

Gregg et al., U.S. Appl. No. 13/044,844, filed Mar. 10, 2011.

* cited by examiner

*Primary Examiner* — Tuan H Nguyen
(74) *Attorney, Agent, or Firm* — Treyz Law Group; Jason Tsai

(57) ABSTRACT

A test station may include a test host, a signal generator, and a test chamber. Multiple devices under test (DUTs) may be placed in the test chamber during device characterization operations. Radio-frequency signals may be conveyed from the signal generator to the multiple DUTs using a radiated arrangement through an antenna in the test chamber. The signal generator may broadcast downlink test signals. The DUTs may synchronize with the downlink test signals and measure radio-frequency performance levels while receiving the downlink test signals. The test host may direct the signal generator to gradually lower its output power level. The DUTs may be used to determine downlink sensitivity by monitoring the measured radio-frequency performance levels as the output power level of the signal generator is lowered. Downlink sensitivity testing may be performed across any desired radio-frequency bands and channels.

22 Claims, 7 Drawing Sheets

|  TX POWER (dBm) | CHANNEL-1 | | CHANNEL-2 | |
|---|---|---|---|---|
| | SER (%) | RSSI (dBm) | SER (%) | RSSI (dBm) |
| $P_{max}$ { -65 | 1 | -70 | 0.9 | -68 |
| -70 | 2 | -75 | 1.7 | -73 |
| ⋮ | | | | |
| -110 | 9.8 | -114 | 9.6 | -112 |
| -111 | 10.1 | -116 | 9.9 | -113 |
| -112 | NA | -119 | 10.2 | -113.5 |
| -113 | NA | -125 | NA | -116 |
| -114 | NA | -130 | NA | -117 |
| ⋮ $P_{min}$ | | | | |

FIG. 5

SIMULTANEOUS SENSITIVITY TESTING FOR MULTIPLE DEVICES IN RADIO-FREQUENCY TEST SYSTEMS

BACKGROUND

This relates generally to testing wireless electronic devices and, more particularly, to testing multiple wireless electronic devices placed in a test chamber.

Wireless electronic devices typically include transceiver circuitry, antenna circuitry, and other radio-frequency circuitry that provide wireless communications capabilities. During testing, wireless electronic devices under test (DUTs) can exhibit different performance levels. For example, each wireless DUT in a group of DUTs can exhibit its own output power level, gain, frequency response, efficiency, linearity, dynamic range, downlink sensitivity, etc.

The performance of a wireless DUT can be measured using a radio-frequency (RF) test station. A radio-frequency test station typically includes a test host, a tester (i.e., a signal generator), and a test chamber. The signal generator is connected to the test host. Connected in this way, the test host configures the signal generator to transmit downlink radio-frequency signals during test operations.

In conventional radio-frequency test arrangements, a single wireless DUT having a cellular telephone transceiver is placed into the test chamber. The DUT is connected (tethered) to the test host using a radio-frequency cable. Tethering the DUT to the test host provides an undesired ground path for noise to be injected into the DUT.

The test host directs the signal generator to wirelessly broadcast radio-frequency downlink test signals at a first output power level to the cellular telephone transceiver of the DUT. A protocol-compliant data link is established between the signal generator and the DUT (i.e., radio-frequency signals are conveyed between the signal generator and the DUT over the protocol-compliant data link).

The cellular telephone transceiver receives the downlink test signals. The test host directs the DUT to measure a symbol error rate for the received downlink test signals. If the measured symbol error rate is satisfactory (i.e., greater than 10%), the test host directs the signal generator to broadcast downlink test signals at a second output power level that is less than the first output power level. If the measured symbol error rate is unsatisfactory (i.e., less than 10%), the current output power level represents the downlink sensitivity of cellular telephone transceiver (i.e., the DUT notifies the test host that downlink sensitivity has been obtained).

Once the downlink sensitivity has been determined, the DUT is disconnected from the test host (i.e., by unplugging the radio-frequency cable from the DUT) and is removed from the test chamber. To test additional DUTs, a new DUT is connected to the test host (i.e., by plugging the radio-frequency cable into a corresponding mating connector in the new DUT) and is placed into the test chamber.

Wireless testing using this conventional approach may be inefficient, because the process of connecting a DUT to the test host, placing the DUT in the test chamber, testing the DUT, removing the DUT from the test chamber, and disconnecting the DUT from the test host one DUT at a time is time-consuming. Moreover, protocol-based testing allows testing of only a single DUT and requires more tedious measurement processes. Protocol-compliant testing also has a tendency to drops calls when the output power falls below the downlink sensitivity. Re-establishing the protocol compliant calls in order to complete testing can add significant time and cost to the test process.

It would therefore be desirable to be able to provide improved ways of performing sensitivity testing.

SUMMARY

Test stations in a radio-frequency test system can be used to perform wireless testing on wireless devices under test (DUTs). Each test station may include a test host, a tester (e.g., a signal generator), and a test chamber. During wireless testing, more than one DUT may be placed within the test chamber.

Radio-frequency signals may be conveyed between the tester and the multiple DUTs through a test antenna that is placed within the test chamber. The antenna may transmit and receive radio-frequency signals to and from the multiple DUTs in the test chamber. Testing the DUTs using this radiated test setup takes into account the effect of over-the-air transmission.

Downlink sensitivity testing may be performed on the multiple DUTs in parallel. Each DUT may include cellular telephone transceiver circuitry, wireless local area network circuitry, and other wireless circuitry. The downlink sensitivity for the any transceiver circuitry of each DUT may be tested in parallel (as an example). Downlink sensitivity may be defined as the minimum output power level of radio-frequency signals transmitted from another wireless device for which the received radio-frequency signals exhibit a performance level (e.g., symbol error rate, bit error rate, frame error rate, packet error rate, data rate, dynamic range, error vector magnitude, frequency response, etc.) satisfying design criteria.

During downlink sensitivity testing, each DUT may be configured to receive radio-frequency signals in a predetermined channel pattern (sequence). For example, the cellular telephone circuitry may be configured to calculate downlink sensitivity for wireless transmission in channel-1, channel-2, channel-3, and so on in that particular order.

The test host may direct the tester to broadcast radio-frequency signals using the predetermined sequence over a communications path which is not necessarily based on standard protocol (e.g., wireless communication between the tester and the DUTs is not governed by standard communications protocol such as the Global System for Mobile Communications standard, Code Division Multiple Access standard, WiFi®, Bluetooth®, etc.).

The tester may transmit initialization radio-frequency (RF) signals in channel-1. These initialization signals may be part of a repeating signals pattern and may have some common properties with the test signals. The DUTs may receive the initialization signals and may respond by sending acknowledgement signals back to the tester. These acknowledgement signals may be wireless signals, conducted signals, or may not be used at all. When a DUT receives said initialization sequence, the DUT is said to have "synchronized" with channel-1 (e.g., the DUTs are now ready to receive and decode test signals transmitted in channel-1 from the tester).

The tester may then broadcast RF test signals in channel-1. While the tester is broadcasting the test signals in channel-1, the tester may ramp down the test signals' output power level in a step-wise fashion. The DUTs may continuously monitor desired radio-frequency performance metrics (e.g., symbol error rate, bit error rate, frame error rate, packet error rate, receive signal strength indicator, data rate, dynamic range, error vector magnitude, frequency response, power spectral density, etc.) as the output power is stepped down.

For any given DUT, if at any point the measured performance metric fails to satisfy performance criteria (e.g., the measured symbol error rate exceeds a maximum acceptable threshold level), that DUT may calculate its downlink sensitivity by taking into account the time elapsed since synchronization with channel 1 and a base receive signal strength indicator (e.g., the receive signal strength indicator measured immediately following synchronization). Once the DUT has calculated its downlink sensitivity, the DUT may record the calculated sensitivity value for channel 1, unsynchronized with channel 1, temporarily stop performing measurements, and configure itself to wait to receive initialization signals in channel-2 (e.g., the next channel in the predetermined pattern of channels).

Testing may continue using this approach until each DUT has calculated its downlink sensitivity at each desired channel in the predetermined pattern of channels. The DUTs may individually signal to a test operator to indicate completion of the test. The DUTs may then be removed from the test chamber. The calculated downlink sensitivity may be loaded onto the test host or may be stored on the DUT for later retrieval or analysis.

When testing multiple DUTs, testing of each DUT may start at different times. Each DUT may wait to synchronize on the first channel in the predetermined pattern of channels. Each DUT may alternatively start testing on any channel in the predetermined pattern of channels on which the initialization sequence is received. When a DUT starts testing, it may scan the predetermined pattern of channels to determine which channel is currently being broadcast by the tester. It may then attempt to start testing on the current channel, or may move to the next channel in the predetermined pattern of channels and wait for the initialization signal from the tester.

Further features of the present invention, its nature and various advantages will be more apparent from the accompanying drawings and the following detailed description.

BRIEF DESCRIPTION OF THE DRAWINGS

FIG. 5 is a table illustrating how symbol error rate may vary as a function of output power and frequency in accordance with an embodiment of the present invention.

DETAILED DESCRIPTION

Wireless electronic devices include antenna and transceiver circuitry that support wireless communications. Examples of wireless electronic devices include desktop computers, computer monitors, computer monitors containing embedded computers, wireless computer cards, wireless adapters, televisions, set-top boxes, gaming consoles, routers, or other electronic equipment. Examples of portable wireless electronic devices include laptop computers, tablet computers, handheld computers, cellular telephones, media players, and small devices such as wrist-watch devices, pendant devices, headphone and earpiece devices, and other miniature devices.

Devices such as these are often provided with wireless communications capabilities. For example, electronic devices may use long-range wireless communications circuitry such as cellular telephone circuitry to communicate using cellular telephone bands at 850 MHz, 900 MHz, 1800 MHz, and 1900 MHz (e.g., the main Global System for Mobile Communications or GSM cellular telephone bands). Long-range wireless communications circuitry may also handle the 2100 MHz band.

Electronic devices may use short-range wireless communications links to handle communications with nearby equipment. For example, electronic devices may communicate using the WiFi® (IEEE 802.11) bands at 2.4 GHz and 5 GHz and the Bluetooth® band at 2.4 GHz. It is sometimes desirable to receive satellite navigation system signals such as signals from the Global Positioning System (GPS). Electronic devices may therefore be provided with circuitry for receiving satellite navigation signals such as GPS signals at 1575 MHz.

Figure 1:
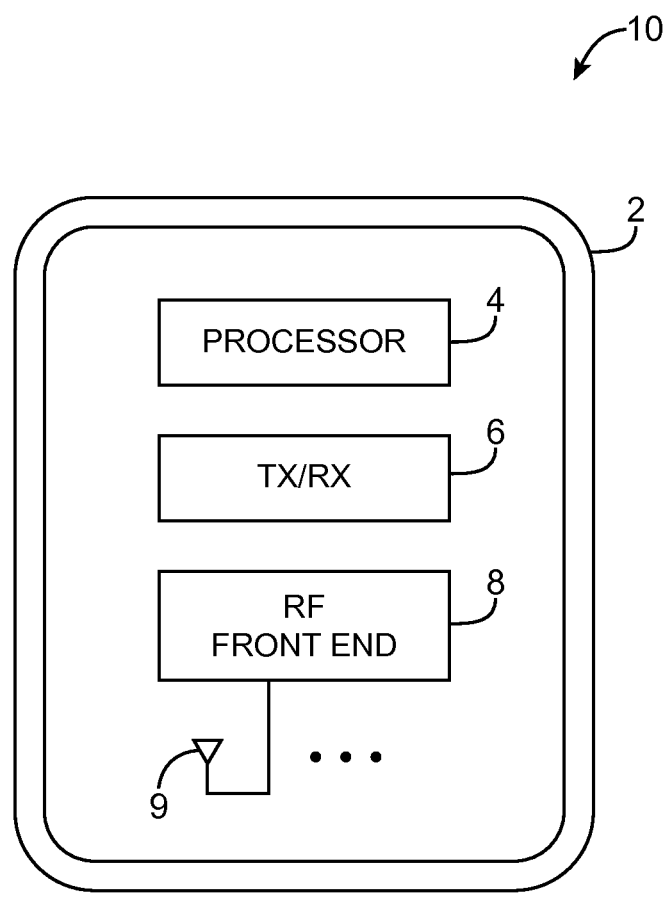
FIG. 1 is a diagram of an illustrative wireless device under test with radio-frequency circuitry in accordance with an embodiment of the present invention.

In testing environments, the wireless electronic devices are sometimes referred to as devices under test (DUTs). FIG. 1 shows an example of a test device such as DUT 10. DUT 10 may be a portable electronic device, a cellular telephone, a computer, a multimedia device, or other electronic equipment. DUT 10 may have a device housing such as housing 2 that forms a case for its associated components.

DUT 10 may have storage and processing circuitry such as storage and processing circuitry 4. Storage and processing circuitry 4 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 4 may be used to control the operation of device 10. This processing circuitry may be based on one or more microprocessors, microcontrollers, digital signal processors, application specific integrated circuits, etc.

Circuitry 4 may interact with a transceiver circuit such as transceiver circuit 6. Transceiver circuit 6 may include an analog-to-digital converter (ADC), a digital-to-analog converter (DAC), a digital down-converter (DDC), and a digital up-converter (DUC).

In a scenario in which DUT 10 is transmitting, circuitry 4 may provide digital data (e.g., baseband signals) to the DUC. The DUC may convert or modulate the baseband digital signals to an intermediate frequency (IF). The IF digital signals may be fed to the DAC to convert the IF digital signals to IF analog signals. The IF analog signals may then be fed to an RF front end such as RF front end 8.

When DUT 10 is receiving wireless signals, RF front end 8 may provide incoming IF analog signals to the ADC. The ADC may convert the incoming IF analog signals to incoming IF digital signals. The incoming IF digital signals may then be fed to the DDC. The DDC may convert the incoming IF digital signals to incoming baseband digital signals. The incoming baseband digital signals may then be provided to circuitry 4 for further processing. Transceiver circuit 6 may either up-convert baseband signals to IF signals or down-convert IF signals to baseband signals. Transceiver block 6 may therefore sometimes be referred to as an IF stage.

RF front end 8 may include circuitry that couples transceiver block 6 to one or more antenna such as antenna 9. RF front end 8 may include circuitry such as matching circuits, band-pass filters, mixers, low noise amplifier circuitry, power amplifier circuitry, etc. Circuitry 4, transceiver block 6, RF front end 8, and antenna 9 may be housed within housing 2.

In the scenario in which DUT 10 is transmitting, RF front end 8 may up-convert the IF analog signals from transceiver block 6 to RF analog signals (e.g., the RF signals typically have higher frequencies than the IF signals). The RF analog signals may be fed to antenna 9 for broadcast. If desired, more than one antenna may be used in DUT 10.

In the scenario in which DUT 10 is receiving wireless signals, antenna 9 may receive incoming RF analog signals from a broadcasting device such as a base transceiver station, network access point, etc. The incoming RF analog signals may be fed to RF front end 8. RF front end 8 may down-convert the incoming RF analog signals to IF analog signals. The IF analog signals may then be fed to transceiver circuit 6 for further data processing.

Examples of cellular telephone standards that may be supported by the wireless circuitry of device 10 include: the Global System for Mobile Communications (GSM) "2G" cellular telephone standard, the Evolution-Data Optimized (EVDO) cellular telephone standard, the "3G" Universal Mobile Telecommunications System (UMTS) cellular telephone standard, the "3G" Code Division Multiple Access 2000 (CDMA 2000) cellular telephone standard, and the "4G" Long Term Evolution (LTE) cellular telephone standard. Other cellular telephone standards may be used if desired. These cellular telephone standards are merely illustrative.

It may be desirable to be able to determine downlink sensitivity of DUT 10 during device characterization (e.g., to measure downlink sensitivity of the cellular telephone circuitry prior to production testing). Downlink sensitivity may be defined as the minimum output power level of radio-frequency signals transmitted using another wireless device (e.g., a signal generator) for which the radio-frequency signals received by DUT 10 still satisfies performance criteria. The performance criteria may, for example, specify an acceptable threshold level for the quality of the received radio-frequency signals.

Consider a scenario in which the performance criteria specify a maximum frame error rate (e.g., an error rate calculated by dividing the number of lost frames by the total number of transmitted frames during a given time interval) of 1.0%. A first set of radio-frequency signals may be transmitted at an output power level of −109 dBm, whereas a second set of radio-frequency signals may be transmitted at an output power level of −110 dBm. The cellular telephone circuitry of DUT 10 may receive the first set of radio-frequency signals at a corresponding frame error rate of 0.9%, whereas the cellular telephone circuitry of DUT 10 may receive the second set of radio-frequency signals at a corresponding frame error rate of 1.1%. The downlink sensitivity of DUT 10 may therefore be approximately equal to −109 dBm, because a −110 dBm output power level yields a frame error rate that exceeds the maximum acceptable threshold level of 1.0% (as an example).

The cellular telephone circuitry of DUT 10 may exhibit different downlink sensitivity levels depending on the frequency band and channel to which DUT 10 is currently tuned. For example, the downlink sensitivity of DUT 10 may be equal to −115 dBm when DUT 10 receives radio-frequency signals in a first channel, whereas the downlink sensitivity of DUT 10 may be equal to −112 dBm when DUT 10 receives radio-frequency signals in a second channel that is different from the first channel. It may be desirable to characterize the downlink sensitivity of DUT 10 at a desired set of channels.

Figure 2:
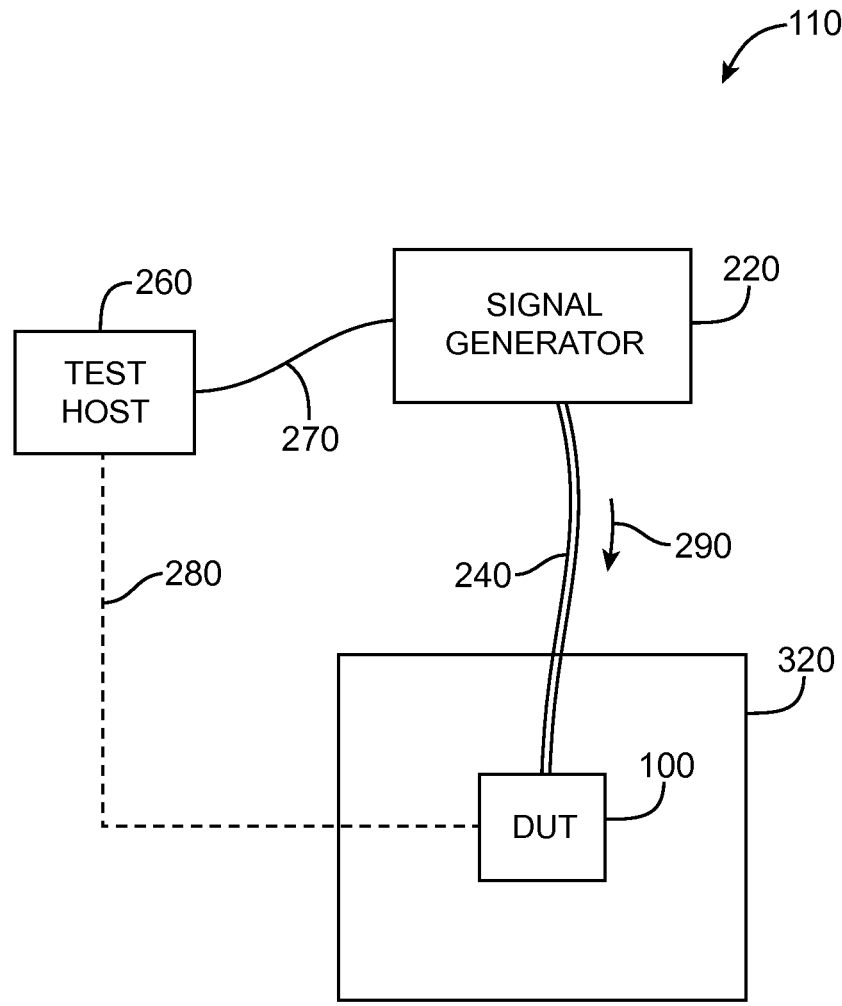
FIG. 2 is a diagram of a conventional test station that includes a test host, a signal generator, and a test chamber.

FIG. 2 is a diagram of conventional test system 110 that can be used to measure downlink sensitivity of DUT 100. As shown in FIG. 2, conventional test system 110 includes test host 260, signal generator 220, and test chamber 320. Signal generator 220 is connected to test host 260 through line 270.

During downlink sensitivity testing, DUT 100 is placed within test chamber 320. DUT 100 is connected to signal generator 220 through radio-frequency cable 240 and is connected (tethered) to test host 260 through cable 280. Test host 260 directs signal generator 220 to transmit radio-frequency signals to DUT 100 in the direction of arrow 290 through cable 240 (see, FIG. 2). The radio-frequency signals are conveyed between DUT 100 and signal generator 220 over a protocol-compliant link (i.e., an active telephone call session has been established between signal generator 220 and the cellular telephone circuitry of DUT 100).

Testing one DUT at a time using the test setup of FIG. 2 may be time-consuming because the devices under test are tested sequentially one at a time and because protocol-based testing requires all signaling and measurement sequences to adhere to strict protocol guidelines. These protocol-based signals further may require DUTs to transmit uplink RF signals to the tester. Uplink signals may interfere with other nearby DUTs. Moreover, tethering DUT 100 to test host 260 may introduce a ground path through which undesired noise couples into DUT 100.

Figure 3:
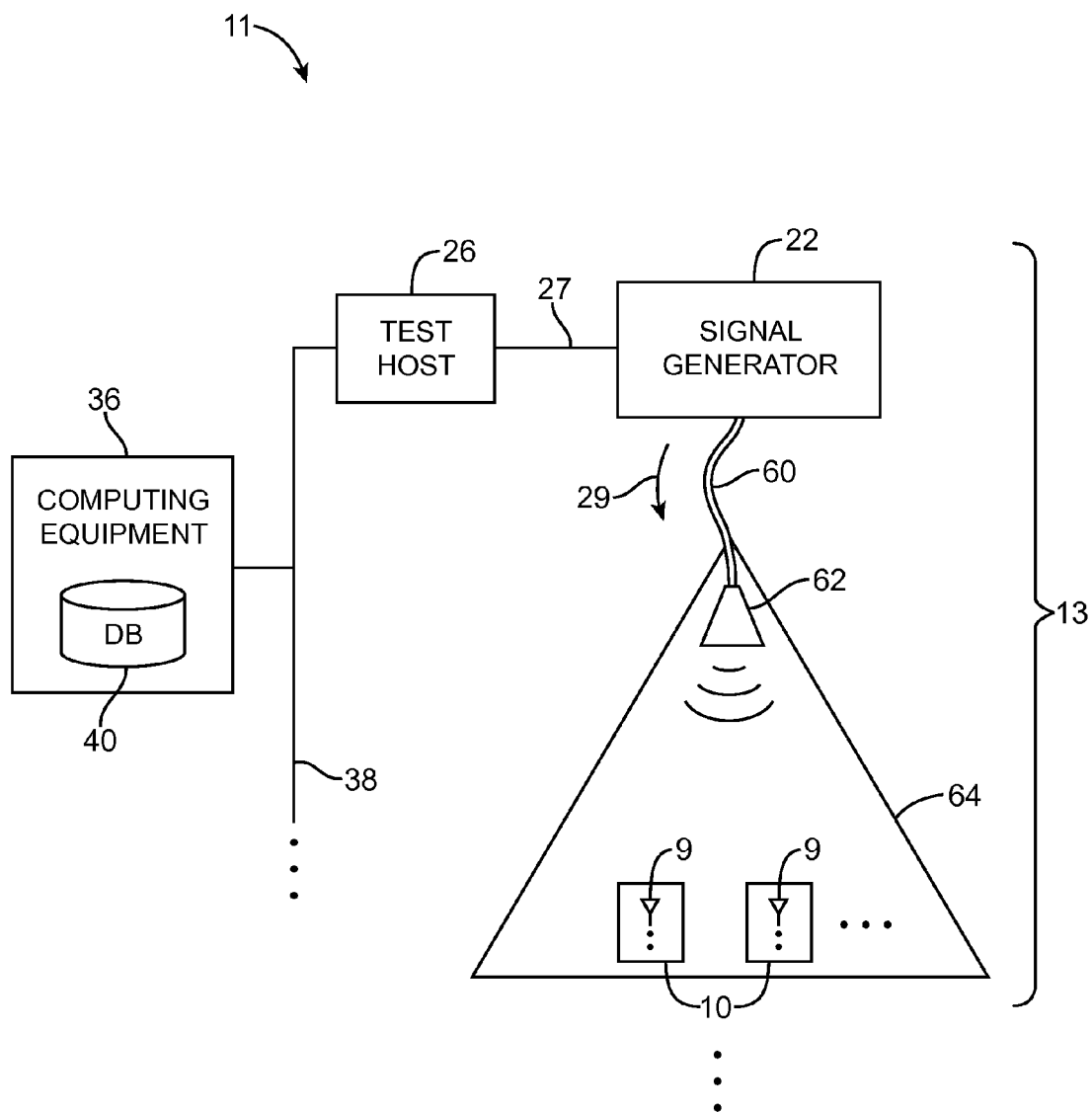
FIG. 3 is a diagram of illustrative test stations each connected to computing equipment and each including a test host, a tester, a test chamber, and an antenna in the test chamber in accordance with an embodiment of the present invention.

During testing, many wireless devices (e.g., hundreds, thousands, or more of DUTs 10) may be tested in a test system such as test system 11 of FIG. 3. Test system 11 may include test accessories, computers, network equipment, tester control boxes, cabling, test chambers, test antennas within the test chambers, and other test equipment for transmitting and receiving radio-frequency test signals and gathering test results. Test system 11 may include multiple test stations such as test stations 13. There may, for example, be eighty test stations 13 at a given test site. Test system 11 may include any desired number of test stations to achieve desired test throughput.

Each test station 13 may include a test host such as test host 26, a signal generator such as signal generator 22, and a test chamber such as test chamber 64. Test host 26 may, for example, be a personal computer or other types of computing equipment.

Signal generator 22 may be a radio communications tester of the type that is sometimes referred to as a call box or a base station emulator. Signal generator 22 may, for example, be the CMU200 Universal Radio Communication Tester available from Rohde & Schwarz. Signal generator 22 may be used to emulate the behavior of a base transceiver station during a telephone call with the cellular telephone transceiver circuitry of DUT 10 (as an example). If desired, signal generator 22 may be configured to emulate the behavior of a network access point to test the ability of transceiver 6 to support the WiFi® communications protocol, the Bluetooth® communications protocol, or other communications standards.

Signal generator 22 may be operated directly or via computer control (e.g., when signal generator 22 receives commands from test host 26). When operated directly, a user may control signal generator 22 by supplying commands directly to the signal generator using the user input interface of signal generator 22. For example, a user may press buttons in a control panel on the signal generator while viewing information that is displayed on a display in generator 22. In computer controlled configurations, a test host such as computer 26

(e.g., software running autonomously or semi-autonomously on the computer) may communicate with signal generator 22 (e.g., by sending and receiving data over a wired path 27 or a wireless path between the computer and the signal generator).

During wireless testing, more than one DUT 10 may be placed within test chamber 64 (e.g., DUTs 10 may be simultaneously tested in parallel). DUTs 10 need not be electrically connected (tethered) to test host 26 (i.e., DUTs 10 are disconnected from test host 26). Test chamber 64 may have a cubic structure (six planar walls), a rectangular prism-like structure (six rectangular walls), or other suitable structures. Test chamber 64 may, for example, be a pyramidal-shaped transverse electromagnetic (TEM) cell (see, e.g., FIG. 3). TEM cell 64 may be used to perform electromagnetic compatibility (EMC) radiated tests without experiencing interference from ambient electromagnetic environment. The test chamber may be sized to accommodate a single DUT or many DUTs.

Test station 13 may be configured to perform over-the-air (OTA) testing (sometimes referred to as radiated testing). In the test setup of FIG. 3, signal generator 22 may be connected to a test antenna such as antenna 62 through RF cable 60. Antenna 62 may be a microstrip antenna such as a microstrip patch antenna, a horn antenna, or other types of antennas. Antenna 62 may be placed within test chamber 64.

During downlink signal transmission, signal generator 22 may generate radio-frequency test signals in the direction of arrow 29. Antenna 62 may wirelessly transmit the test signals to DUTs 10 in TEM cell 64 over a non-protocol-compliant communications path (e.g., an active telephone call need not be established). Antennas 9 in DUTs 10 may receive the radiated test signals.

DUTs 10 may be loaded with a test operating system (e.g., an operating system that lacks a graphical user interface) or a normal user operating system (e.g., an operating system that includes a graphical user interface). DUTs 10 may each include wireless performance measurement circuitry capable of analyzing the received test signals. For example, each DUT 10 may be capable of receiving the test signals transmitted by signal generator 22 and measuring desired receive performance (e.g., DUT 10 may be able to generate receive signal strength indicator, bit error rate, symbol error rate, frame error rate, packet error rate, etc.).

As shown FIG. 3, each test station 13 may be connected to computing equipment 36 through line 38. Computing equipment 36 may include storage equipment on which a database 40 is stored. After downlink sensitivity testing has been completed at the desired frequencies, DUTs 10 may indicate to a test operator (e.g. using the DUT's graphical user interface) completion of the test. DUTs 10 may then be removed from test chamber 64. Test data (e.g., calculated downlink sensitivity of each DUT 10 at different channels) may then be loaded onto associated test host 26. The downlink sensitivity data may be stored on the DUT for later collection and analysis. The downlink sensitivity information gathered at the different test stations 13 may be stored in database 40.

Figure 4A:
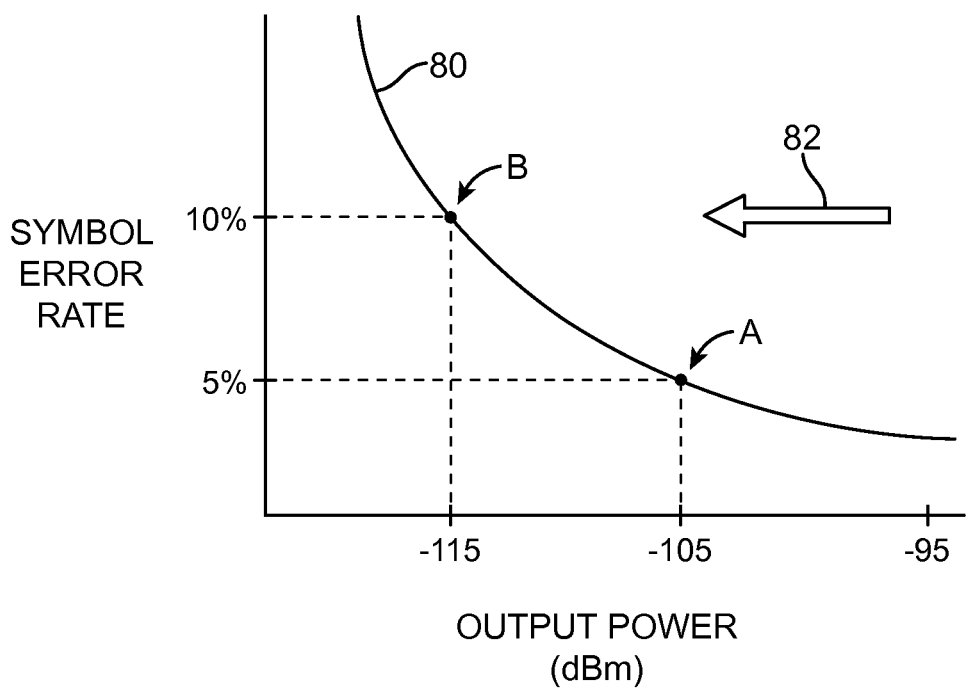
FIG. 4A is a plot illustrating how symbol error rate may vary as a function of output power in accordance with an embodiment of the present invention.

FIG. 4A is a plot showing how a communications performance metric such as symbol error rate may vary as a function of output power level. As shown in FIG. 4A, characteristic curve 80 plots the relationship between symbol error rate (SER) and output power. In general, a lower output power level corresponds to a higher error rate.

Downlink sensitivity may be determined by ramping down the output power level (in the direction of arrow 82) and monitoring the corresponding symbol error rate. It may be desirable to ramp the tester output power over a wide dynamic range (e.g. 90 dB). For example, consider a scenario in which the maximum acceptable symbol error rate specified by design criteria is equal to 10%. If the output power level of radio-frequency signals generated using signal generator 22 is equal to −105 dBm, the corresponding symbol error rate will be equal to 5% (point A). If the output power level of radio-frequency signals generated using signal generator 22 is equal to −115 dBm, the corresponding symbol error rate will be equal to 10% (point B). The downlink sensitivity is therefore equal to −115 dBm (as an example), because any point at or to the left of point B will yield a symbol error rate that is greater than or equal to the maximum acceptable SER of 10%.

As another example, it may be desirable to find the highest power which results in a particular radio-frequency performance metric, regardless of the performance metric at lower powers. As another example, it may be desirable to characterize one or more radio-frequency performance metrics across a wide range of output power levels without regard to one or more predefined performance metric limits.

FIG. 4A is merely illustrative. If desired, other radio-frequency performance metrics (e.g., bit error rate, frame error rate, packet error rate, receive power level, dynamic range, adjacent channel leakage ratio, error vector magnitude, power spectral density, etc.) may be monitored while changing the output power level to determine the downlink sensitivity of DUT 10. One or more radio-frequency performance metrics may be monitored by the DUT.

Figure 4B:
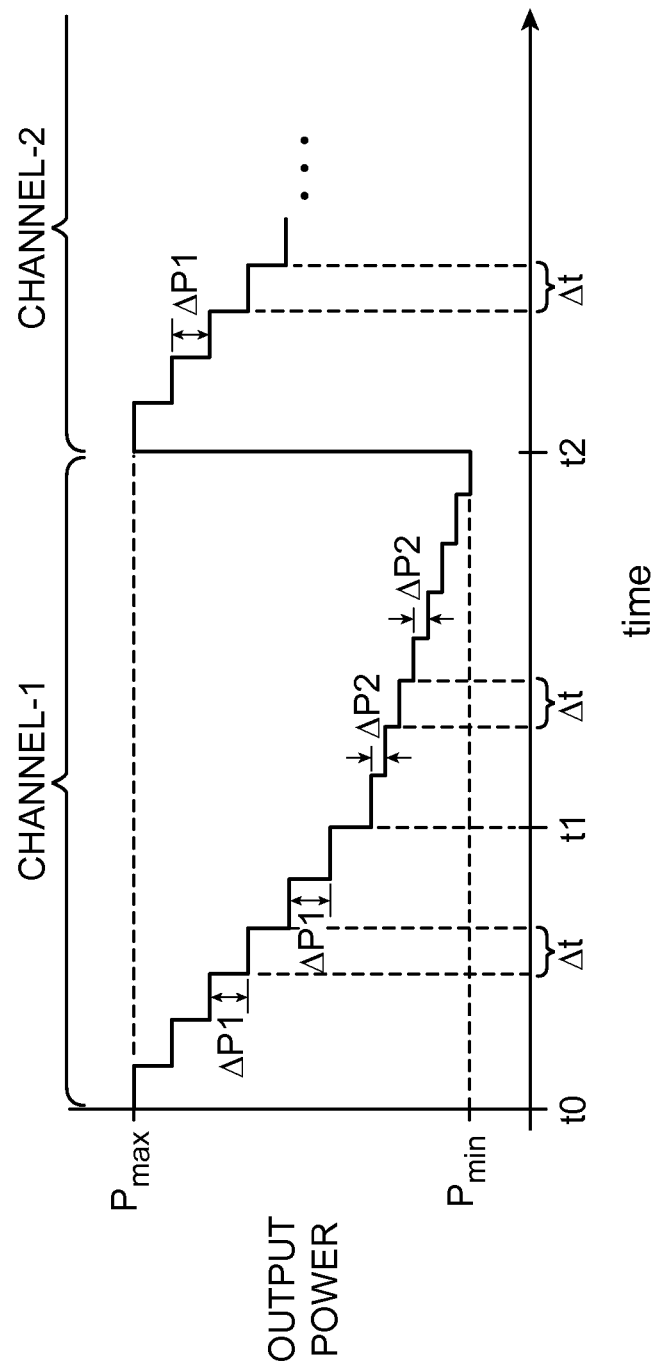
FIG. 4B is a timing diagram illustrating how tester output power may vary in time during downlink sensitivity testing in accordance with an embodiment of the present invention.

FIG. 4B is a timing diagram showing how the output power level may be ramped down in a predictable step-wise fashion. As shown in FIG. 4B, the output power level may be stepped down from a maximum output power level Pmax (e.g., the maximum output power level required for downlink sensitivity testing) to a minimum output power level Pmin (e.g., a minimum output power level required for downlink sensitivity testing) for each channel. It may be desirable to change the tester output power in patterns other than the monotonically decreasing pattern (e.g. alternating up-down step-wise patterns, step-wise increasing, linearly increasing, linearly decreasing, etc.).

The test duration $\Delta t$ for each output power level may be equal. Test duration $\Delta t$ (sometimes referred to as step time) may be determined by the DUT during an initialization signal sequence by monitoring changes in the receive signal strength indicator (RSSI) while the output power level is close to Pmax (e.g., by calculating the time interval between successive drops in RSSI when the output power level is within 20 dB of Pmax).

The RSSI measured during this initialization signal period may be referred to as a base RSSI. The base RSSI may be used to characterize the receive capability of each DUT 10. For example, if Pmax is equal to −65 dBm and the corresponding base RSSI is equal to −70 dBm, the DUT may have an offset of 5 dB. This offset may be different for each DUT 10 and may be accounted for during downlink sensitivity calculation.

The change in output power may be larger at higher output power levels (see, e.g., $\Delta P1$ from time t0 to t1), whereas the change in output power may be smaller at lower output power levels (see, e.g., $\Delta P2$ from time t1 to t2). When it is desirable to determine the DUT's minimum sensitivity level, this arrangement speeds up testing during higher power levels where receive capability is substantially robust and provides finer resolution during lower power levels for accurate downlink sensitivity calculation. This sequence of lowering the output power level may be consistent for each channel measured. In other words, the current output power level of signal generator 22 can be determined by monitoring the number of changes in RSSI (e.g., by keeping track of the total number of elapsed Δt) following time t0. It may further be desirable for the DUT to monitor the current RSSI level relative to the base RSSI level at each step during testing.

Each DUT 10 is able to calculate its downlink sensitivity before Pmin is reached. When Pmin is reached, the output power level is set to Pmax to begin testing a successive channel (time t2).

Downlink sensitivity testing described herein may follow a predetermined (predictable) sequence or pattern for testing the different channels (e.g., tester 22 may perform downlink testing in accordance with a common order list of predetermined channels to be tested that is also known to each of DUTs 10). For example, test host 26, signal generator 22, and the multiple DUTs in test chamber 64 are configured to calculate downlink sensitivity in channel-1, channel-2, channel-3, and so on in that particular order (see, e.g., FIG. 4B). When a given DUT has calculated its downlink sensitivity for channel-1, the given DUT ceases all measurements associated with channel-1 and configures itself to wait for signal generator 22 to begin testing in channel-2.

When testing multiple DUTs, testing of each DUT may start at different times. In other words, a test operator may insert DUTs into a test chamber one at a time thus allowing for a continuous process flow instead of a batched process flow. Each DUT may wait to synchronize on the channel-1 in the predetermined pattern of channels. Each DUT may alternatively start testing on any channel in the predetermined pattern of channels on which the initialization sequence is received. In this second scenario, a DUT may start testing by scanning the predetermined pattern of channels to determine which channel is currently being broadcast by the tester. It may then attempt to start testing on the channel found, or may move to the next channel in the predetermined pattern of channels and wait for the initialization signal from the tester on this second channel.

As shown in FIG. 5, illustrative table 88 of radio-frequency performance levels may be measured using DUT 10. Table 88 may include measured symbol error rates for decreasing output power levels at each channel in a predetermined pattern of channels to be tested. At a Pmax of −65 dBm, the base RSSI for channel-1 may be equal to −70 dBm, whereas the base RSSI for channel-2 may be equal to −68 dBm. An offset of 5 dB (−65 minus −70) may therefore exist for channel-1, whereas an offset of 3 dB (−65 minus −68) may exist for channel-2 (as examples).

The measured symbol error rates (SER) increases (worsens) as transmit (TX) output power is stepped down in the way as described in connection with FIG. 4B (e.g., ΔP1 is 5 dB while ΔP2 is 1 dB). In this example, the predetermined threshold (i.e., the maximum acceptable symbol error rate) may be set to 10%. DUT 10 will continue measuring SER until the SER exceeds the 10% threshold. For example, DUT 10 measures an SER of 10.1% when tester output power is equal to −111 dBm for channel-1 (see, e.g., box 90 in FIG. 5), whereas DUT 10 measures an SER of 10.2% when the tester output power is equal to −112 dBm (see, e.g., box 92 in FIG. 5). DUT 10 calculates the corresponding output power level of tester 22 by monitoring the number of changes in RSSI since synchronization with channel-1 (e.g., each time RSSI changes indicates a predictable drop in output power level).

Taking into account the offset of DUT 10 in each channel, the downlink sensitivity of DUT 10 may therefore be equal to −116 dBm (−111 minus the offset of 5 dB) for channel-1 and equal to −115 dBm (−112 minus the offset of 3 dB) for channel-2. When it is desired to only test against a predetermined SER limit, the SER measurements need not be taken by DUT 10 after the downlink sensitivity has been calculated at a given channel. When DUT 10 obtains its calculated downlink sensitivity, it records that value, and waits for signal generator 22 to begin testing the next channel in the predetermined pattern of channels to be tested (e.g., DUTs 10 will wait for initialization signals to be broadcast in channel-2, and the tester will begin transmitting in channel-2 once Pmin has been reached for channel-1). If desired, the maximum acceptable symbol error rate may be less than 10% or greater than 10% (e.g., the predetermined threshold value may be user-specified). It may alternatively be desirable to characterize the SER performance at all power levels. In this case, DUT 10 may record SER at all levels until Pmin or until DUT 10 can no longer receive any power in the test channel.

Figure 6:
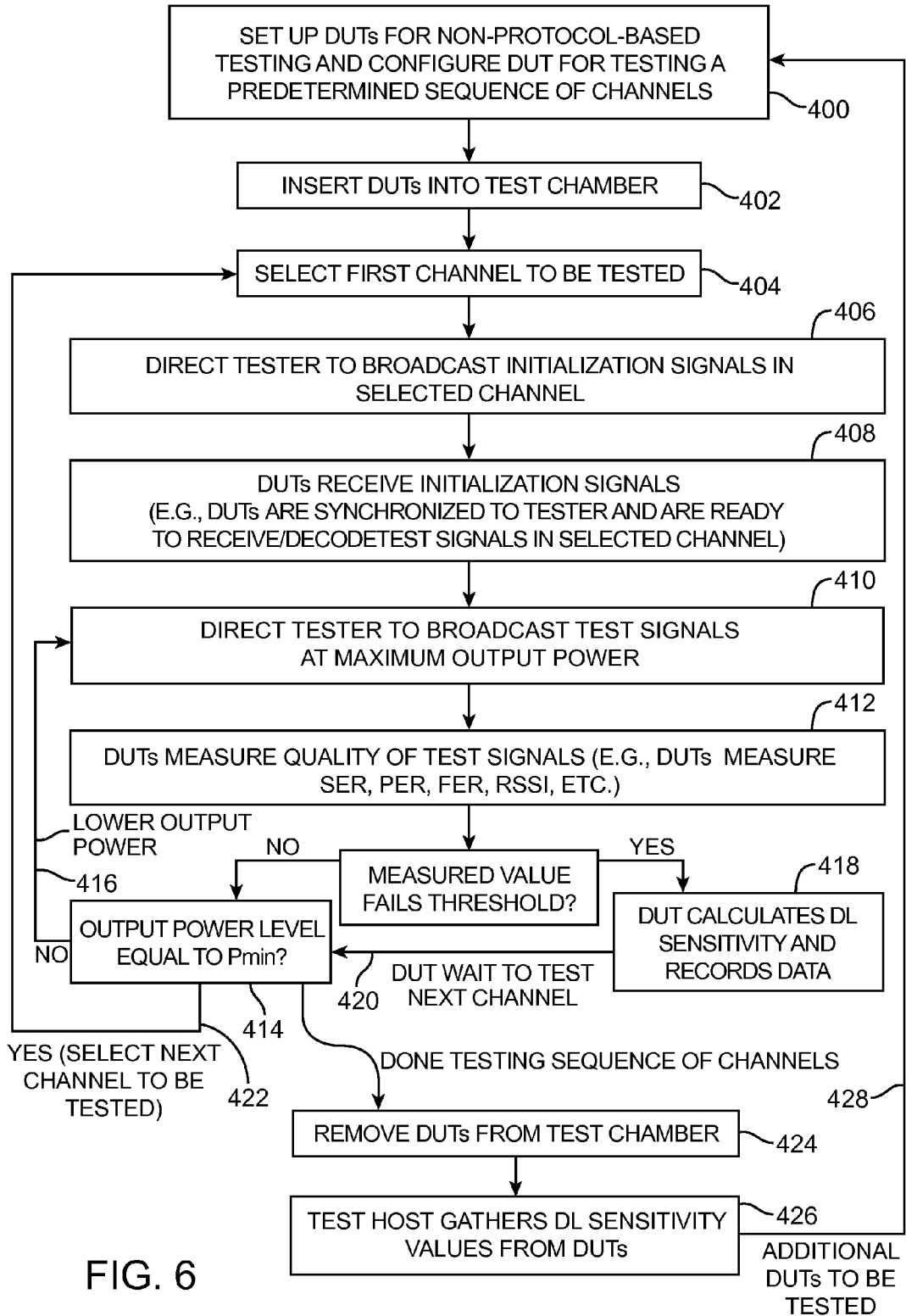
FIG. 6 is a flow chart of illustrative steps involved in performing simultaneous downlink sensitivity testing for multiple devices under test placed within a test chamber in accordance with an embodiment of the present invention.

FIG. 6 is a flow chart of illustrative steps that can be used to obtain downlink sensitivity values for multiple DUTs 10 using the test setup of FIG. 3. At step 400, DUTs 10 may be configured to perform non-protocol-based wireless communication. DUTs 10 may run an application that maintains a predetermined pattern of channels to be tested. Tester 22 may broadcast downlink test signals in the order specified by the predetermined pattern of channels.

At step 402, DUTs 10 may be placed into test chamber 64. At step 404, a first channel in the list of predetermined channels may be selected for testing. At step 406, test host 26 may direct tester 22 to broadcast initialization signals in the first channel. These initialization signals may be part of a repeating signals pattern and may have some common properties with test signals.

At step 408, DUTs 10 may receive the initialization signals. When DUTs 10 receives said initialization signals, DUTs 10 are said to have "synchronized" to the first channel (e.g., DUTs 10 are ready to receive and decode test signals in the first channel).

At step 410, test host 26 may direct tester 22 to broadcast test signals at output power Pmax. At step 412, DUTs 10 may measure one or more radio-frequency performance metrics of the received test signals (e.g., DUTs 10 may measure symbol error rate, packet error rate, frame error rate, bit error rate, data rate, receive signal strength indicator, error vector magnitude, frequency response, power spectral density, etc.). DUT 10 may measure a base RSSI when tester 22 transmits test signals at high output power levels (e.g., when output power level is within 20 dB of Pmax).

If the measured value satisfies a user-specified threshold level, processing proceeds to step 414. At step 414, test host 26 checks whether the current output power level is equal to Pmin. If Pmin has not been reached, the output power is stepped down in the way described in connection with FIG. 4B, and processing may loop back to step 410 as indicated by path 416 (e.g., tester 22 will broadcast test signals using a lower output power level).

If the measured value fails to satisfy the threshold level for a given DUT, the given DUT may calculate its downlink sensitivity level by taking into account the base RSSI and may record this data internally (step 418). The given DUT then waits for tester 22 to broadcast initialization signals for the next channel to be tested (path 420).

At step 414, if Pmin has been reached, testing for the first channel is complete. If there are additional channels to be tested in the predetermined pattern (sequence) of channels, processing will loop back to step 404 as indicated by path 422 (e.g., downlink sensitivity testing for a second channel in the list of predetermined channels will commence).

When all the desired channels have been tested, DUTs 10 may be removed from test chamber 64 (step 424). At step 426, test host 26 may be used to gather the downlink sensitivity values from each DUT 10. If there are additional DUTs to be tested, processing may loop back to step 400 as indicated by step 428 to perform downlink sensitivity testing on a new set of DUTs.

The steps of FIG. 6 are merely illustrative. If desired, the steps of FIG. 6 may be used during device characterization, product design testing, production testing, or other test phases.

The foregoing is merely illustrative of the principles of this invention and various modifications can be made by those skilled in the art without departing from the scope and spirit of the invention.

What is claimed is:

1. A method of performing downlink sensitivity testing on a plurality of devices under test with a test station, wherein each of the plurality of devices under test includes storage circuitry, and wherein the test station includes a tester and a test chamber in which the plurality of devices under test are tested, the method comprising:
   directing the tester to wirelessly broadcast initialization signals in a radio-frequency channel to each of the plurality of devices under test.

2. The method defined in claim 1, further comprising:
   with the tester, wirelessly broadcasting test signals to each of the plurality of devices under test at a first output power level in the radio-frequency channel.

3. The method defined in claim 2, further comprising:
   after using the tester to broadcast the test signals at the first output power level for a given period of time during which each of the plurality of devices under test receives the test signals and measures a corresponding receive power level for the test signals, directing the tester to broadcast test signals to the plurality of devices under test at a second output power level that is lower than the first output power level in the radio-frequency channel.

4. The method defined in claim 2, further comprising:
   after using the tester to broadcast the test signals at the first output power level for a given period of time during which each of the plurality of devices under test receives the test signals and measures a plurality of corresponding radio-frequency performance metrics for the test signals, directing the tester to broadcast test signals to the plurality of devices under test at a second output power level that is different from the first output power level in the radio-frequency channel, wherein the plurality of radio-frequency performance metrics include metrics selected from the group consisting of: a symbol error rate, a bit error rate, a frame error rate, a packet error rate, and power spectral density.

5. The method defined in claim 4, wherein the test station further includes a test host and wherein directing the tester to wirelessly broadcast the initialization signals in the radio-frequency channel to each of the plurality of devices under test comprises:
   with the test host, directing the tester to wirelessly broadcast the initialization signals in the radio-frequency channel to each of the plurality of devices under test.

6. The method defined in claim 5, further comprising:
   with the test host, directing the tester to wirelessly broadcast initialization and test radio-frequency signals in an additional radio-frequency channel to each of the plurality of devices under test.

7. The method defined in claim 6, further comprising:
   removing the plurality of devices under test from the test chamber; and
   with the test host, gathering calculated downlink sensitivity data from each of the plurality of devices under test.

8. The method defined in claim 7, wherein each of the plurality of devices under test comprises cellular telephone circuitry and wherein wirelessly broadcasting the test signals to the plurality of devices under test at the first output power level in the radio-frequency channel comprises:
   wirelessly broadcasting the test signals to the cellular telephone circuitry in each of the plurality of devices under test at the first output power level in the radio-frequency channel.

9. The method defined in claim 2, wherein wirelessly broadcasting the test signals to each of the plurality of devices under test at the first output power level in the radio-frequency channel comprises:
   wirelessly broadcasting the test signals to each of the plurality of devices under test over a non-protocol-compliant communications path.

10. A method of testing a plurality of devices under test with a test station, wherein the plurality of devices under test are not electrically connected to the test station, the method comprising:
    configuring each of the plurality of devices under test to sequentially receive radio-frequency signals in a plurality of radio-frequency channels in accordance with a common ordered list of predetermined channels to be tested; and
    with the test station, performing downlink testing by sequentially broadcasting radio-frequency signals in each of the plurality of radio-frequency channels in the common ordered list of predetermined channels to be tested.

11. The method defined in claim 10, wherein the test station comprises a tester, a test host, and a test chamber and wherein performing downlink testing comprises:
    with the test host, directing the tester to sequentially broadcast the radio-frequency signals in each of the plurality of radio-frequency channels in the common ordered list of predetermined channels to be tested, wherein each of the plurality of devices under test are placed in the test chamber and wherein the radio-frequency signals are wirelessly transmitted to each of the plurality of devices under test over a non-protocol-compliant path.

12. The method defined in claim 11, wherein performing downlink testing further comprises:
    with each of the plurality of devices under test, receiving the radio-frequency signals broadcast from the tester; and
    with each of the plurality of devices under test, measuring a corresponding radio-frequency performance metric for the received radio-frequency signals.

13. The method defined in claim 12, wherein measuring the corresponding radio-frequency performance metric comprises:
    measuring a metric selected from the group consisting of: a symbol error rate, a bit error rate, a frame error rate, a packet error rate, power spectral density, and a receive signal strength indicator.

14. The method defined in claim 13, wherein directing the tester to sequentially broadcast the radio-frequency signals in each of the plurality of radio-frequency channels in the common ordered list of predetermined channels to be tested comprises:
    directing the tester to broadcast the radio-frequency signals at different output power levels for each of the plurality of radio-frequency channels in the common ordered list of predetermined channels to be tested.

15. The method defined in claim 14, further comprising:

with each of the plurality of devices under test, computing a downlink sensitivity value for each of the plurality of radio-frequency channels in the common ordered list of predetermined channels to be tested when the measured radio-frequency metric fails to satisfy a user-specified threshold.

16. The method defined in claim 15, wherein each of the devices under test comprises cellular telephone transceiver circuitry and wherein computing the downlink sensitivity value comprises:

with each of the plurality of devices under test, computing the downlink sensitivity value for the cellular telephone transceiver circuitry of that device under test at each of the plurality of radio-frequency channels in the common ordered list of predetermined channels to be tested.

17. A radio-frequency test station with a test chamber in which a plurality of devices under test are tested, comprising:
a test host;
a tester; and
an antenna within the test chamber that is coupled to the tester, wherein the tester simultaneously transmits radio-frequency signals to the devices under test through the antenna during wireless testing and wherein the plurality of devices under test are disconnected from the test host.

18. The radio-frequency test station defined in claim 17, wherein the test chamber comprises a transverse electromagnetic cell.

19. The radio-frequency test station defined in claim 17, wherein the antenna comprises a microstrip antenna.

20. The radio-frequency test station defined in claim 17, wherein the tester comprises a signal generator.

21. The radio-frequency test station defined in claim 17, wherein the test chamber comprises a room.

22. The radio-frequency test station defined in claim 17, wherein the test chamber comprises a radio-frequency shielded room.

* * * * *